(12) United States Patent
Raymond et al.

(10) Patent No.: US 8,430,361 B2
(45) Date of Patent: Apr. 30, 2013

(54) METHOD AND DEVICE ENABLING A ROCKET ENGINE PUMP TO BE DRIVEN BY AN INTERNAL COMBUSTION ENGINE

(75) Inventors: Gerald Raymond, Medard en Jalles (FR); Paul Caye, Courdimanche (FR); Frederic Richard, Paris (FR)

(73) Assignee: Astrium SAS, Paris (FR)

( * ) Notice: Subject to any disclaimer, the term of this patent is extended or adjusted under 35 U.S.C. 154(b) by 529 days.

(21) Appl. No.: 12/680,608

(22) PCT Filed: Oct. 7, 2008

(86) PCT No.: PCT/EP2008/063397
§ 371 (c)(1),
(2), (4) Date: Jun. 22, 2010

(87) PCT Pub. No.: WO2009/047250
PCT Pub. Date: Apr. 16, 2009

(65) Prior Publication Data
US 2010/0252686 A1    Oct. 7, 2010

(30) Foreign Application Priority Data
Oct. 8, 2007 (FR) .................................. 07 58125

(51) Int. Cl.
*B64G 1/40* (2006.01)

(52) U.S. Cl.
USPC .......................... 244/172.2; 60/260

(58) Field of Classification Search ................ 244/53 R, 244/62, 63, 74, 171.1, 171.3, 172.2, 172.3; 60/246, 257, 259, 260
See application file for complete search history.

(56) References Cited

U.S. PATENT DOCUMENTS

| | | |
|---|---|---|
| 2,531,761 A | 11/1950 | Zucron |
| 3,069,849 A | 12/1962 | Crim |
| 3,168,809 A | 2/1965 | Holmes et al. |

FOREIGN PATENT DOCUMENTS

| | | |
|---|---|---|
| DE | 38 38 574 A1 | 6/1989 |
| FR | 2801936 A1 | 6/2001 |
| GB | 876186 A | 8/1961 |
| WO | WO-99/65769 A2 | 12/1999 |

*Primary Examiner* — Timothy D Collins
*Assistant Examiner* — Nicholas McFall
(74) *Attorney, Agent, or Firm* — Im IP Law PLLC; C. Andrew Im

(57) ABSTRACT

The subject of the invention is a device for driving a pump of a rocket engine of a space vehicle that comprises an air-breathing internal combustion engine running on an oxidizer/fuel mixture of the air/hydrocarbon type, wherein the supply of oxidant and fuel is provided by tanks and a circuit that are separate from the propellant tanks of the rocket engine. The invention applies to a device for fueling a rocket engine that includes at least two pumps, each driven by the device of the invention, and means for controlling the internal combustion engines for driving the pumps, adapted for independently varying the operating parameters of these engines so as to independently adjust the rotation speeds of the pumps.

14 Claims, 2 Drawing Sheets

METHOD AND DEVICE ENABLING A ROCKET ENGINE PUMP TO BE DRIVEN BY AN INTERNAL COMBUSTION ENGINE

RELATED APPLICATIONS

This application is a §371 application from PCT/EP2008/063397 filed Oct. 7, 2008, which claims priority from French Patent Application No. 07 58125 filed Oct. 8, 2007, each of which is herein incorporated by reference in its entirety.

TECHNICAL FIELD OF THE INVENTION

The present invention relates to a device and a method for driving a pump of a rocket engine with an internal combustion engine.

The technical field to which the present invention relates is that of high-thrust rocket propulsion, like that required for a space launcher.

BACKGROUND OF THE INVENTION

For this type of application, there are three families of technologies, depending on the physical state of the propellants used: solid propulsion, wherein the propellant is stored in a combustion chamber, liquid propulsion, which can use one, two or even more propellants, wherein propellants must be transferred from storage tanks to a combustion chamber, and hybrid propulsion, which uses a liquid propellant and a solid propellant, and wherein a liquid propellant must be transferred to a combustion chamber in which a solid propellant is stored.

The present invention relates more precisely to devices for transferring liquid propellants to the combustion chamber and more specifically to the drive system for this transfer.

In order to be capable of providing high thrust, rocket engines must run at a high pressure of several tens of bar, for example from 30 to 50 bar for Ariane engines, with a high flow of matter.

In the case of liquid propulsion, it is the propellant feed system that must provide this flow and this pressure. Two methods are commonly used to produce this pressurized feed: direct pressurization of the propellant tanks and pumping with pumps from a low-pressure tank.

The first solution has the virtue of simplicity, but requires tanks capable of withstanding high pressures, which creates problems in terms of mass and safety. This solution is limited in practice to low-power engines, such as attitude control engines or the upper stages of launchers for example, where installing an external means of pressurization is less advantageous.

The second solution requires the use of specific pumps capable of producing the substantial flow required by the engines. This flow, combined with the huge increase in pressure required, results in pumps of considerable power, from several hundred kilowatts to several megawatts.

In current and past space launchers, these pumps are systematically driven by centrifugal turbines, generally using the same propellants as the main engine.

These centrifugal turbines are driven by hot gases. These hot gases are generally produced by taking a portion of the propellants for the rocket engine and burning these portions in a specific small combustion chamber. They can also be produced by a gas generator, often a small powder rocket.

A centrifugal turbine/pump assembly is called a turbopump. A turbopump is a complex, fragile object because it must transmit very high levels of power—several megawatts—using very high rotation speeds, for example from 10,000 to 30,000 rpm, which exerts very high mechanical stresses on the materials.

In addition, being driven by hot gases resulting from combustion produces very high temperatures in the turbine and very large temperature gradients in the transmission shafts between the turbine and the pump.

This thermal gradient effect is further accentuated when the propellants are cryogenic, the pump temperature being several tens of degrees Kelvin while only a few centimeters away, the temperature of the driving centrifugal turbine is more than 1,000 degrees Celsius.

Lastly, because of these extreme operating conditions, starting a turbopump is difficult, with one part being cooled, the other being heated, and the assembly being brought to rotation gradually enough not to cause an even higher transient gradient capable of rupturing the turbopump.

Ultimately, a turbopump is a very expensive object with a short life, used in conventional launchers which have a short operating life that is measured in minutes.

In reusable launchers like the space shuttle, the turbopumps must be replaced for nearly every flight, which is quite onerous in terms of maintenance costs.

One proposed solution for replacing a turbopump is described in the document U.S. Pat. No. 6,457,306.

This document specifically describes replacing the drive turbine of the pump with a battery-powered electric motor.

Thus, there is no longer a need for a small rocket engine driving a turbine, less propellant is consumed, there are no longer such high temperature gradients, and the assembly is more reliable and better adapted to a reusable launcher.

It is also possible to adjust the rotation of the electric motor and thus vary the propellant flows, and hence the thrust, more easily; it is also easier to control the start of the pump so as to prevent excessively high transient gradients.

On the other hand, the energy source that powers the engine must be capable of supplying a power that is measured in megawatts during the thrust phase, which entails significant mass and size constraints for this energy source and for the means for powering the electric motor.

The energy storage system and motor are ultimately very heavy.

OBJECT AND SUMMARY OF THE INVENTION

The object of the present invention is to provide a system for driving a propellant pump that is simple, reliable, can be started in flight, and can in particular be used in reusable propulsion systems.

To this end, the invention proposes replacing the turbine engine of the pump or the electric motor with a simple device, separate from the propellants, which can be started and controlled independently of the operation of the propulsion system of the vehicle, and it provides for using an internal combustion engine for this purpose.

More precisely, the present invention provides a device for driving a pump of a rocket engine of a space vehicle, characterized in that it comprises an air-breathing internal combustion engine running on an oxidizer/fuel mixture of the air/hydrocarbon type, wherein the supply of oxidizer and fuel is provided by tanks and a circuit that are separate from the propellant tanks of the rocket engine.

The use of such an oxidizer not normally used in space technologies because of the mass of nitrogen, which is useless for combustion, is preferred in this case in order to allow the use of an internal combustion engine of the air-breathing type proven in the terrestrial field while retaining the operating parameters of such an engine.

More specifically, the oxidizer required by said internal combustion engine is contained in a pressurized tank connected to said engine by a pressure reducing valve.

The oxidizer is advantageously constituted by oxygen-enriched air or nitrous gas-enriched air.

Preferably, the fuel is a liquid hydrocarbon.

The fuel in a first variant is kerosene, for example in accordance with the American standard ASTM D1655 and its various revisions, and essentially as described, for example, in Article 19 of the 2007 FIA (International Automobile Federation) regulations, or the EN 228 standard in a second variant.

According to a first advantageous embodiment of the invention, the internal combustion engine is a piston engine.

According to an alternative embodiment, said internal combustion engine is an axial turbine-and-compressor engine.

Advantageously, said axial turbine engine is a helicopter engine.

The invention also relates to a device for driving a pump for fueling a rocket engine that includes an electric starter for said internal combustion engine.

Preferably, said internal combustion engine includes a cooling circuit operating as a closed circuit by means of a heat exchanger placed on the propellant feed lines of the rocket engine.

The invention also provides a device for fueling a rocket engine, characterized in that it includes at least two pumps, each driven by a driving device according to the invention, and means for controlling the internal combustion engines for driving the pumps, adapted for independently varying the operating parameters of said engines so as to independently adjust the rotation speeds of the pumps, and a method for starting and fueling a rocket engine by means of pumps driven by at least one device according to the invention, characterized in that it includes:
- a step for starting the internal combustion engine of said at least one device at an altitude at which the rocket engine is fired and the pump coupled with the internal combustion engine is cooled,
- a step for opening valves of propellant tanks of the rocket engine simultaneous with an increase in the nominal operating speed of the internal combustion engine,
- a step for priming the pumps with the pressure from the propellant tanks and for starting to fuel the rocket engine,
- an adjustment of the flow rate of the pumps by adjusting the rotation speed of the internal combustion engine or engines for driving the pumps.

The invention is particularly applicable to reusable launchers and applies in particular to a space plane, i.e. a space launcher capable of taking off from the ground like an airplane, then leaving the earth's atmosphere to reach outer space.

In space, these space planes use a non-fuel-breathing propulsion system of the rocket engine type. For their atmospheric flight, they use air-breathing propulsion systems such as reactors.

The invention makes it possible to drive the pumps of the rocket engine of the space plane with a robust and proven device using an oxidizer and a fuel that is simple to use and to produce, the device remaining light enough to be installed on board the space plane.

BRIEF DESCRIPTION OF THE DRAWINGS

Other features and advantages of the invention will be more clearly understood by reading the following description of a nonlimiting exemplary embodiment of the invention accompanied by the drawings, which represent.

DETAILED DESCRIPTION OF THE EMBODIMENTS

Figure 1:
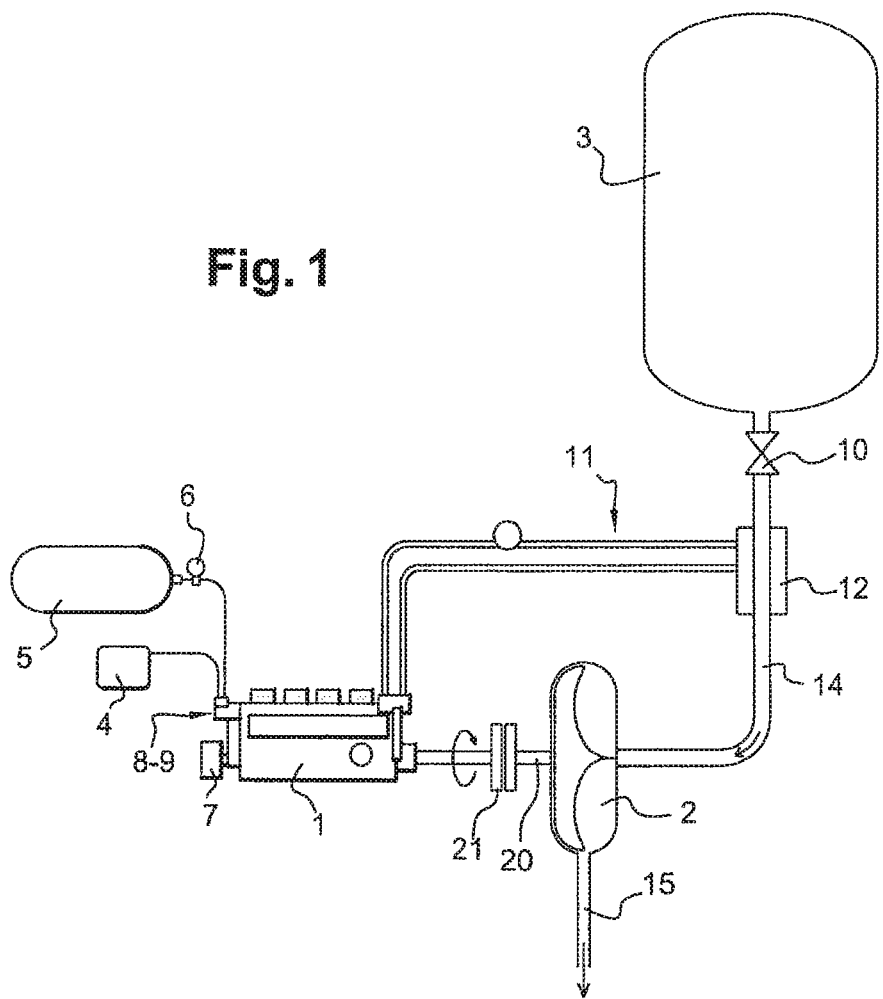
FIG. 1 is a schematic representation of the principle of the device of the invention.

Schematic FIG. 1 describes the use of an internal combustion engine 1 of the piston engine type to drive a pump 2 for fueling a rocket engine of a space plane.

In such a vehicle, rocket propulsion is used only after an airplane-type flight.

However, the internal combustion engine 1 could be used for any application of a rocket engine, be it a launcher stage, an interplanetary vehicle or a satellite, insofar, of course, as the replacement of a centrifugal turbopump drive system is desired.

According to FIG. 1, the internal combustion engine 1 is coupled with the shaft of the centrifugal pump 2 by a shaft 20 through a clutch 21 of a type known in internal combustion engines.

The air-breathing internal combustion engine is used in a non-atmospheric flight phase and is fueled by means of a tank 4 placed in proximity to the engine. Its supply of oxidizer is provided by means of a tank 5 of compressed air equipped with a pressure reducing valve 6.

Thus, an air-breathing environment is simulated through the use of a compressed tank and a pressure reducing valve.

The compressed air may be replaced by oxygen- or nitrous gas-enriched air, a method which increases the available power and reduces the onboard mass, but requires either a change in the setting of the thermodynamic operating point of the engine or an oxygen-containing gas that does not change the onboard mass.

The sequence of operations and of the firing of the rocket engine is as follows.

Upon arriving at the firing altitude of the rocket engine, the internal combustion engine is started by a starter 7 of the electric starter type. Simultaneously, the pump 2 is cooled and coupled with the engine. The valves 10 of the tanks 3 of the rocket engine are then opened and the propellants fill the pump via an upstream line 14 and at the same time, the engine 1 is brought to its nominal operating speed by control means 8, 9. The pressure from the tanks 3 primes the pumps 2 and the rocket engine is fueled via an outlet line 15 from the pump.

Once the propellants have been exhausted, the internal combustion engine driving the pump or pumps is shut off.

Replacing a centrifugal turbopump turbine, rotated by a gas generator, with an internal combustion engine connected to the pump by a shaft and a clutch makes it possible to eliminate the problems with the starting of the turbine, which is most often done pyrotechnically.

The use of an engine fueled by its own fuel and oxidizer tanks also makes it possible to eliminate the complexity of the fuel supply system of a turbine, which requires a branch in the fuel supply circuit of the rocket engine.

Moreover, internal combustion engines such as piston engines and axial turbine-and-compressor engines by nature offer a much more stable speed than centrifugal turbines driven by a hot gas generator, thus solving the problems with the operational stability of the pump.

In addition, the use of a separately fueled internal combustion engine makes it possible to avoid the risks of an overspeed of the turbine in the phase in which the propellants of the rocket engines are exhausted.

Lastly, the device of the invention solves the problems of coupling very hot and very cold areas on the same shaft by separating the drive element from the pump and by providing a cooling circuit for the drive element.

The flexibility of using an internal combustion engine whose operation is controlled, as compared to a turbopump in which the turbine is simply blown by the hot gases from a gas generator, enables the following operating modes:

gradual starting of the centrifugal pump, thus avoiding the mechanical shocks generated by the pyrotechnical starts of centrifugal turbines, control of the cooling cycle of the pump, precise and easily variable adjustment of the rotation speed of the engine, making it possible to vary the pump flow rate and outlet pressure as a function of the speed required, particularly at the startup of the rocket engine, whereas turbopumps are generally capable of only one rotation speed, the capability to drive the fuel and oxidizer pumps separately, which makes it possible to vary the mixture ratio and to adjust the propellant flows separately in order to adapt to differences in pressure drop in the circuits. In fact, in the case of cryogenic propellants the oxidizer, for example hydrogen or methane, is often used to cool the nozzle. This use requires different fuel/oxidizer pressures in the engine inlet. It is difficult to adjust the optimal operating point when these pressures are supplied by centrifugal pumps driven by a single centrifugal turbine.

For purposes of an exemplary embodiment, the following hypotheses corresponding to the case of a concrete embodiment in the case of a space plane will be considered:

The rocket engine uses liquid methane (LCH4) and liquid oxygen (LOx); the engine runs at an engine inlet pressure of 50 bar for liquid oxygen and 60 bar for methane; it runs for a period of about 80 seconds and requires 7.5 tons of propellants.

Furthermore, the pump speed is on the order of 15,000 rpm. This is the usual speed for LOx and LCH4 pumps.

To calculate the operating parameters of the engines driving the pumps, it is assumed as a conservative hypothesis that the minimum efficiency of the pump is on the order of 60% for a 7500-kg propellant mass to be compressed.

This corresponds to a volume of approximately 9.1 m3, and the flow rates are assumed to be constant at 63.5 lps of liquid oxygen and 51.3 lps of liquid methane.

Based on these parameters, when it comes to the liquid oxygen pump, taking efficiency into account, the power required is 530 kW, or approximately 720 horsepower.

As for the liquid methane pump, when taking efficiency into account, the power required in the case taken as an example is 514 kW or approximately 698 horsepower.

These power levels are very similar, which makes it possible to consider driving the pumps separately with identical engines.

A first solution according to the present invention consists of using internal combustion engines of the competition automobile type wherein the operating speed and power are adjustable.

With a typical consumption of 0.27 liter per horsepower hour, approximately 8 liters of fuel (for the two engines) are necessary for one mission. The combustion of this quantity of fuel requires 138 kg, or 125 m3, of air. Compressed to 200 bar, this volume is contained in two tanks of 320 liters each.

As seen above, it should be noted that the volume of air can be advantageously reduced by using oxygen- or nitrous gas-enriched air. The use of air in liquified form can also make it possible to reduce the onboard volume.

The power required corresponds to that of the engines used in Formula 1 competition automobiles, which have a power of 750 to 900 horsepower. These engines are built for a minimum life of 10 hours at high power, which corresponds to lasting through two Grand Prix races of approximately 1 hour 30 minutes each plus the test and preparation sessions. Compared to the periods of use anticipated, on the order of 80 s per flight, this makes it possible to carry out 450 to 500 flights on one engine.

Furthermore, this type of engine has a mass of approximately 95 kg, which is still moderate.

According to the present invention, the use of a Formula 1-type engine to drive a pump for fueling a rocket engine in a space vehicle is made possible by the following features of the invention:

the provision of a direct supply of oxidizing air or gas by a compressed tank and a pressure reducing valve, a coupling of the pump to the drive shaft, an adjustment of the fuel supply, particularly in order to adapt to the physical orientation of the engine and the accelerations, an arrangement of the cooling circuit so as to adapt to the external ambient temperature (approximately −50°) and the relative absence of external air.

The preferred solution of the invention is to connect the original cooling circuit 11 of the internal combustion engine or engines to a heat exchanger 12 placed on the feed lines 14 for the propellants, which in this case are cryogenic; this also makes it possible to produce a very compact exchanger.

The flow rate of more than 100 lps makes it possible to provide an amply sufficient heat sink. The cooling liquid used for the cooling circuit of the internal combustion engines is a liquid adapted to and compatible with the extremely low temperatures of the propellants.

A cowling is also provided for the elements that might suffer from a loss of power, the exhaust from the internal combustion engine or engines being discharged directly at the back of the vehicle.

The procedure for starting the internal combustion engine is preferably performed with the engine in the horizontal position to enable it to be lubricated, and the startup is adapted to the low temperature conditions through the use of local reheaters or by bringing the engine up to speed gradually.

The total mass for such parameters and the application of an automobile engine reveals a mass on the order of 500 to 650 kg.

| | |
|---|---|
| Two engines | 170 to 190 kg |
| Fuel | 9 kg |
| Compressed air | 140 kg (with spare capacity) |
| Two compressed air tanks | 160 kg |
| Accessories (starter, electronics, etc.) | 40 kg |
| Two centrifugal pumps | approximately 40 kg |
| Total | 550 to 600 kg and more precisely 559 to 579 kg |

Figure 2:
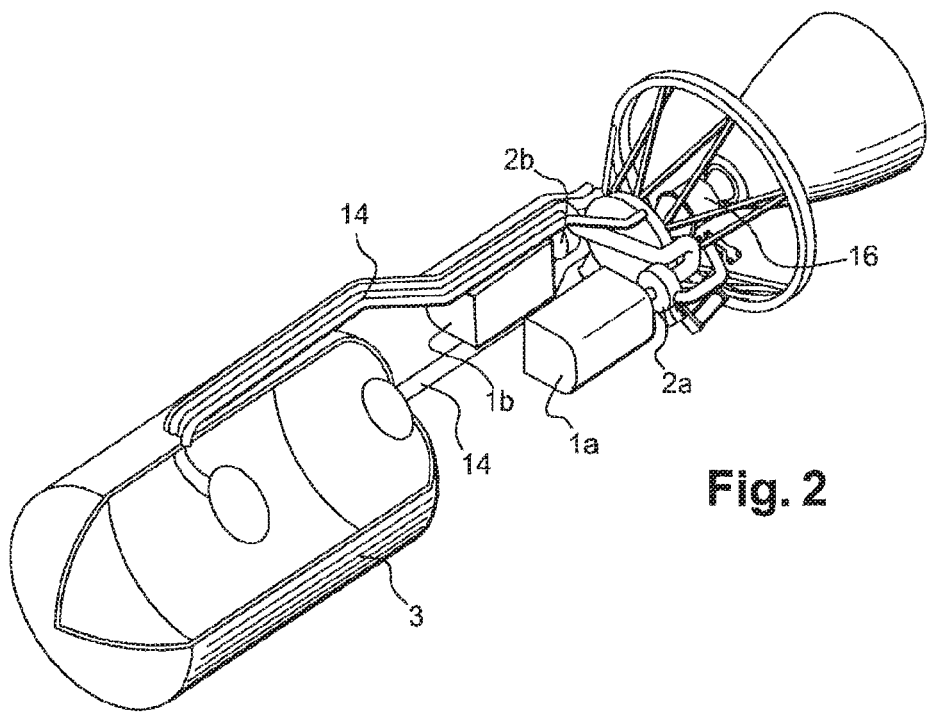
FIG. 2 is an exemplary installation of the device of the invention in a space plane.

FIG. 2 represents an exemplary installation of two internal combustion engines of the piston engine type disposed between a propellant tank 3 and a rocket engine 16 of an aircraft.

The engines are disposed diametrically opposite each other around the axis running through the tank and the rocket engine, above the pumps 2a, 2b fueling the rocket engine 16.

Figure 3:
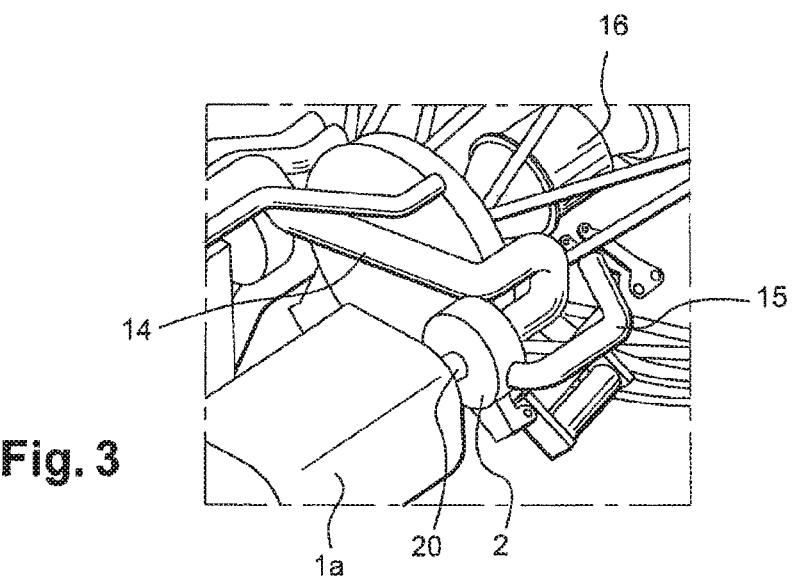
FIG. 3 is a detail of FIG. 2.

The detail of FIG. 3 makes it possible to distinguish the connecting shaft 20 between the engine 1a and the pump 2a.

A second solution consists of using an engine of the helicopter turbine type comprising a compressor, a combustion chamber, and a turbine on a common axis in place of the two piston engines.

A helicopter turbine like the TM333 2B2 from the company Turbomeca is particularly suitable for such an application.

Such a turbine-and-compressor engine can supply approximately 1,100 to 1,200 continuous horsepower at a continuous rotation speed of 6,000 rpm, both of which are adjustable.

In this example, a single axial turbine engine is connected to both pumps, the oxidizer pump and fuel pump of the rocket engine, by means of a fixed reduction gear with control of the speed of the turbine engine in order to increase the rotation speed to the value required for the centrifugal pumps.

The utilization parameters of such an axial turbine engine are as follows:
unit mass: 166 kg
air consumption for 80 seconds of operation: 120 kg
fuel consumption (kerosene): 6 to 7 kg.

The air intake occurs via aspiration of compressed air through a pressure reducing valve at the inlet of the compressor and the exhaust is discharged directly at the back of the vehicle.

The values of the total mass for an axial turbine engine like the helicopter engine as described are of the same order of magnitude as those for the Formula 1-type automobile engine solution.

The mass of the F1 engines and the helicopter turbine engine considered is that of engines taken directly from their field of application and does not take into account the reductions that are possible due to the elimination of elements that are only required for their original application; thus, there are potential savings in terms of mass.

In summary, the device for driving a pump 2 for fueling a rocket engine in a space vehicle comprises at least one internal combustion engine 1 such as an internal combustion engine running on an air/hydrocarbon mixture, a piston engine or an axial turbine engine, and a means 20 for transmitting the rotation of this engine 1 to the pump 2.

According to the example of FIG. 1, the transmission means 20 is a shaft between the internal combustion engine and the pump and the transmission means 20 includes a clutch 21.

According to a first embodiment, the internal combustion engine is a multi-cylinder engine of the competition motor vehicle type.

According to an alternative embodiment, the internal combustion engine 1 is an aeronautical axial turbine-and-compressor engine.

The engine 1 is fueled by its own fuel and oxidizer tanks 4, 5, which are independent of the propellant tanks 3 of the rocket engine.

The oxidizer tank 5 is a pressurized gas tank connected to the air inlet of the engine via a pressure reducing valve 6.

It includes a circuit for cooling by means of a heat exchanger 12 placed on one or more cryogenic propellant feed lines 14, the cooling circuit operating as a closed circuit.

An electric starter 7 makes it possible to start the internal combustion engine.

The device for fueling the rocket engine represented in FIG. 2 includes two pumps, each driven by a driving device 1, 1', and means 8, 9 for controlling the internal combustion engines, adapted for independently varying the operating parameters of said internal combustion engines so as to independently adjust the rotation speeds of the pumps.

The space vehicle according to the invention includes a rocket engine whose fuel supply system comprises at least one pump driven by a device of the invention and means for starting the device while the vehicle is in flight.

The invention has applications in the field of astronautics, and more generally in all of the sectors using rocket engine propulsion with liquid propellants and in those in which a very high fluid flow rate is required for a relatively short time.

It is particularly advantageous when the propellants are cryogenic (liquid oxygen with liquid hydrogen, methane or kerosene).

It is particularly suitable for reusable suborbital vehicle, for which a slight increase in mass is acceptable in return for a lower maintenance cost.

The simplicity of the invention also provides many advantages, particularly the simplicity of its design, lower development and production costs, very high reliability, a stabilized pump speed, and the very important capability of reusing the pump assembly, the current turbopumps being capable of being started no more than a few times.

The invention claimed is:

1. A device driving a rocket engine pump comprising an air-breathing internal combustion engine running on an oxidizer/fuel mixture of the air/hydrocarbon type to drive the rocket engine pump of a rocket engine of a space vehicle; a fuel tank to supply the fuel to the internal combustion engine; an oxidizer tank to supply the oxidizer to the internal combustion engine; and a circuit to operate the device, wherein the circuit operating the device, and the fuel tank and the oxidizer tank supplying the fuel and oxidizer, respectively, to the internal combustion engine are separate from propellant tanks of the rocket engine.

2. The device driving the rocket engine pump of claim 1, wherein the oxidizer tank is a pressurized tank connected to the internal combustion engine by a pressure reducing valve.

3. The device driving the rocket engine pump of claim 1, wherein the oxidizer comprises oxygen-enriched air.

4. The device driving the rocket engine pump of claim 1, wherein the oxidizer comprises nitrous gas-enriched air.

5. The device driving the rocket engine pump of claim 1, wherein the fuel is a liquid hydrocarbon.

6. The device driving the rocket engine pump of claim 1, wherein the fuel is kerosene.

7. The device driving the rocket engine pump of claim 1, wherein the fuel is gasoline.

8. The device driving the rocket engine pump of claim 1, wherein the internal combustion engine is a piston engine.

9. The device driving the rocket engine pump of claim 1, wherein the internal combustion engine is an axial turbine-and-compressor engine.

10. The device driving the rocket engine pump of claim 9, wherein the axial turbine-and-compressor engine is a helicopter engine.

11. The device driving the rocket engine pump of claim 1, further comprising an electric starter for the internal combustion engine.

12. The device driving the rocket engine pump of claim 1, wherein the internal combustion engine comprises a cooling circuit operating as a closed circuit using a heat exchanger connected to propellant feed lines of the rocket engine.

13. A device fueling a rocket engine comprising at least two pumps, each pump driven by the device for driving the rocket engine pump of claim 1; and a controller to independently control and vary operating parameters for each internal combustion engine to independently adjust rotation speeds of said at least two pumps.

14. A method for starting and fueling a rocket engine of a space vehicle using rocket engine pumps, comprising the steps of:

driving each pump of the rocket engine by at least one device comprising an air-breathing internal combustion engine running on an oxidizer/fuel mixture of the air/hydrocarbon type, a fuel tank supplying the fuel to the internal combustion engine, an oxidizer tank supplying the oxidizer to the internal combustion engine, and a circuit to operate said at least one device, wherein the circuit operating said at least one device, and the fuel tank and the oxidizer tank supplying the fuel and oxidizer, respectively, to the internal combustion engine are separate from propellant tanks of the rocket engine;

starting the internal combustion engine of said at least one device at an altitude at which the rocket engine is fired and the pump coupled to the internal combustion engine is cooled;

opening valves of propellant tanks of the rocket engine simultaneous with an increase in the nominal operating speed of the internal combustion engine;

priming the pumps with a pressure from the propellant tanks to initiate fueling of the rocket engine; and adjusting flow rate of propellants through the pumps by adjusting a rotation speed of the internal combustion engine of said at least one device for driving the pumps.

* * * * *